June 16, 1931.    A. T. SPONAR    1,810,887
GAS WATER HEATER
Filed Aug. 9, 1929    5 Sheets-Sheet 1
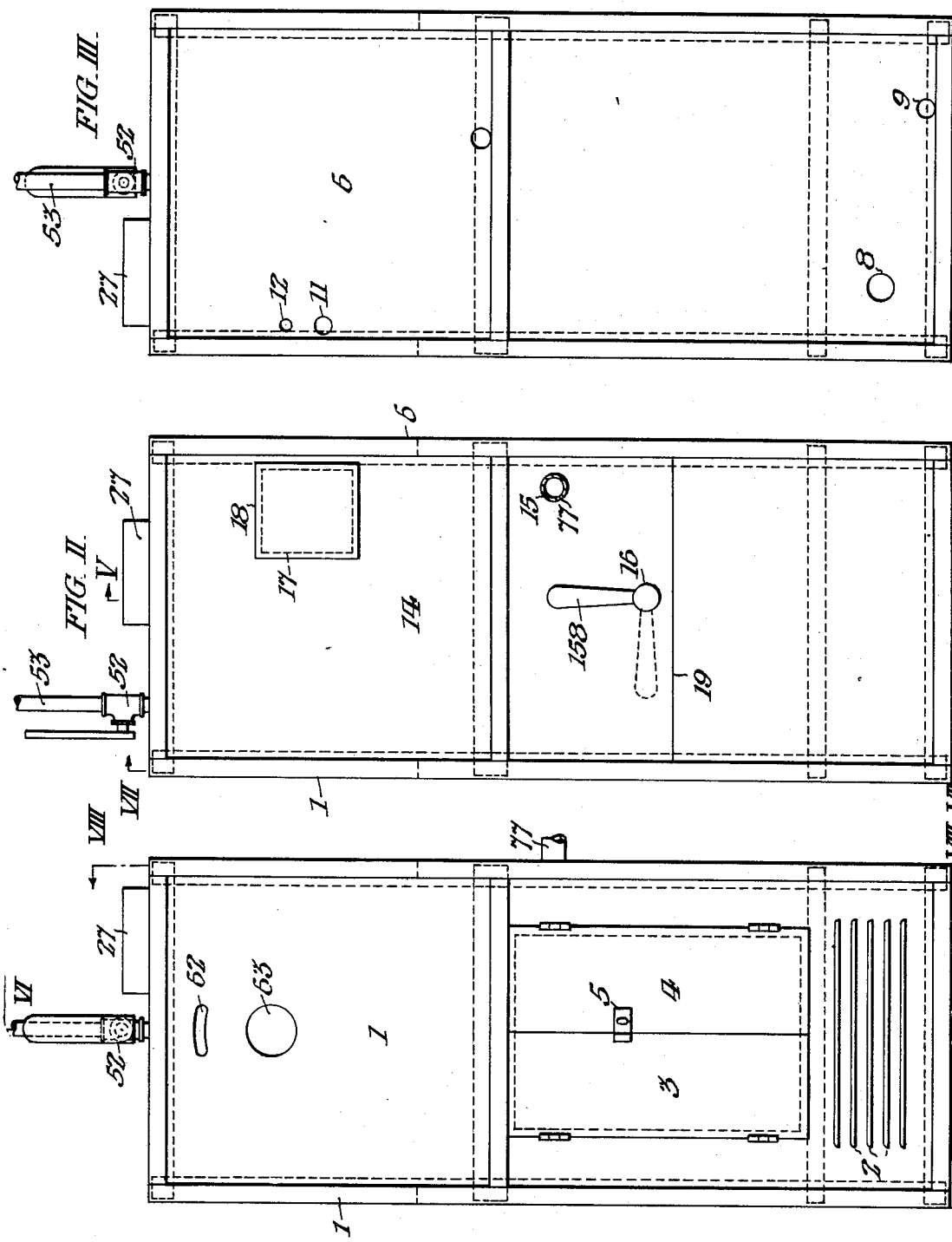
INVENTOR:
ALOYSIUS T. SPONAR.

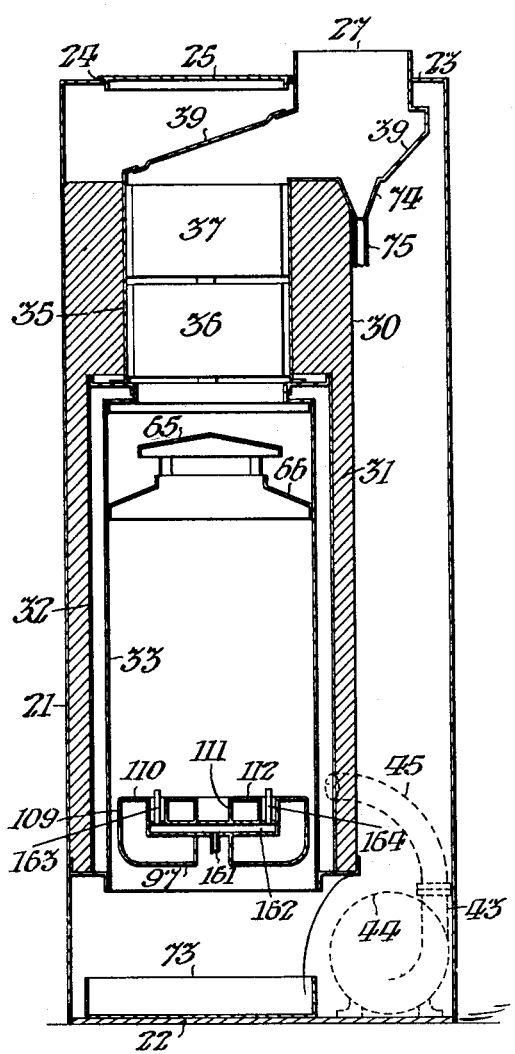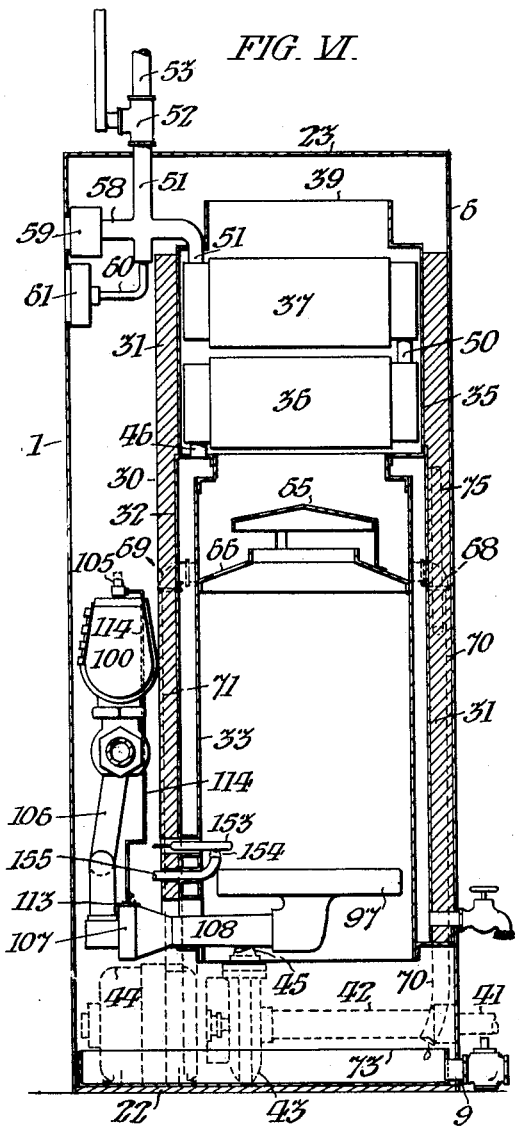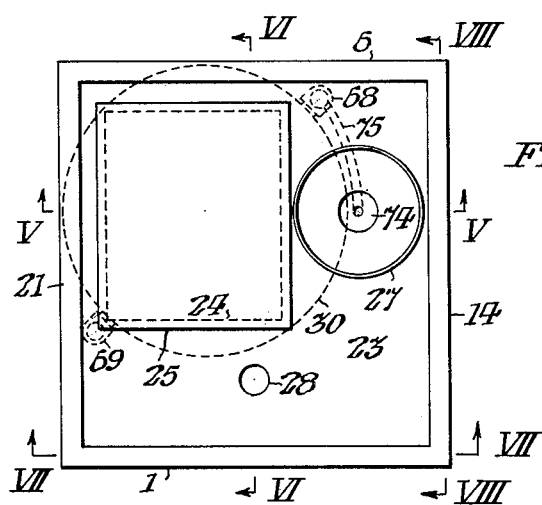

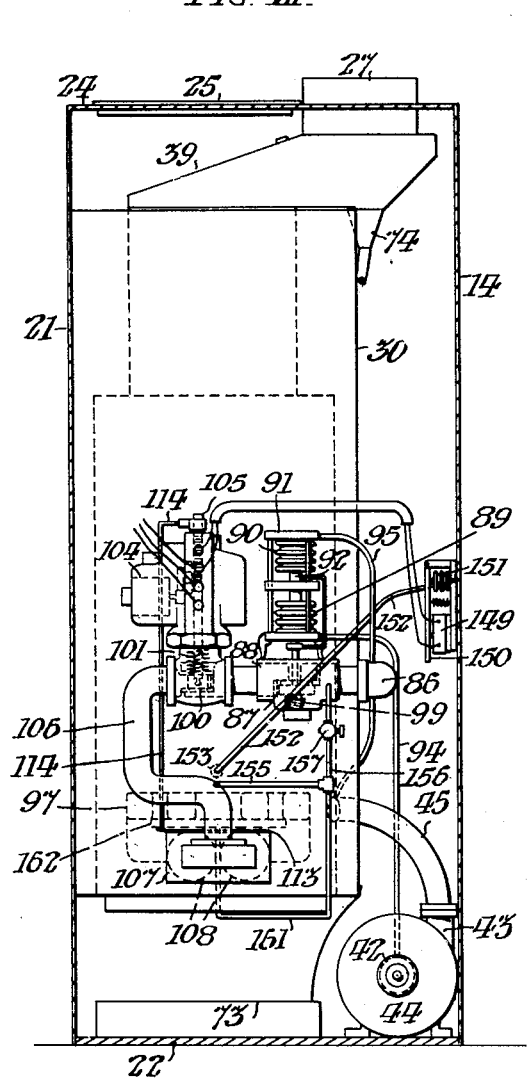
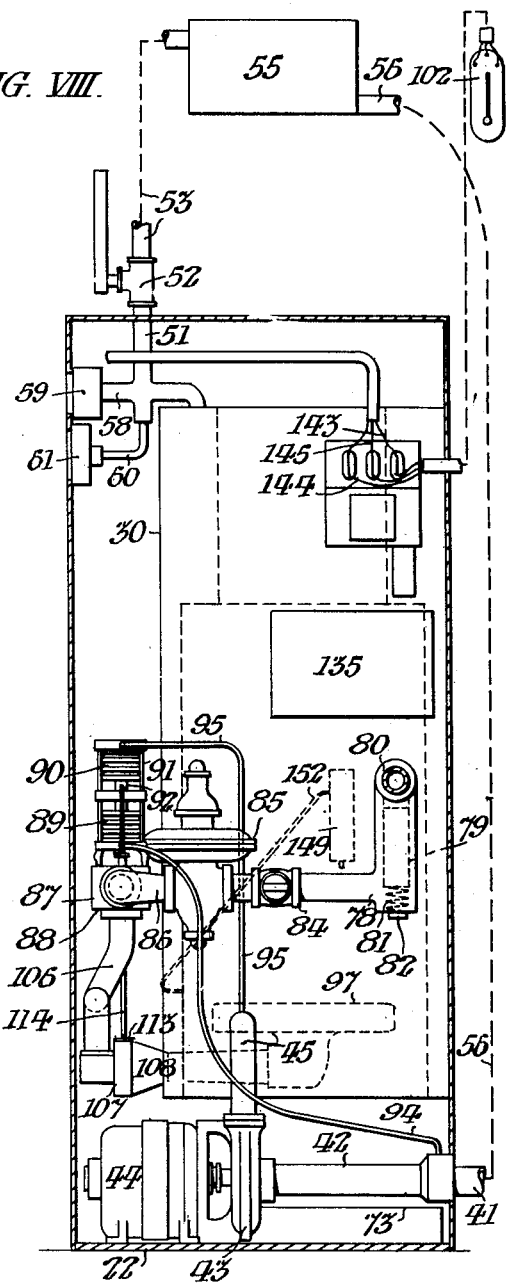

June 16, 1931.  A. T. SPONAR  1,810,887
GAS WATER HEATER
Filed Aug. 9, 1929     5 Sheets-Sheet 4
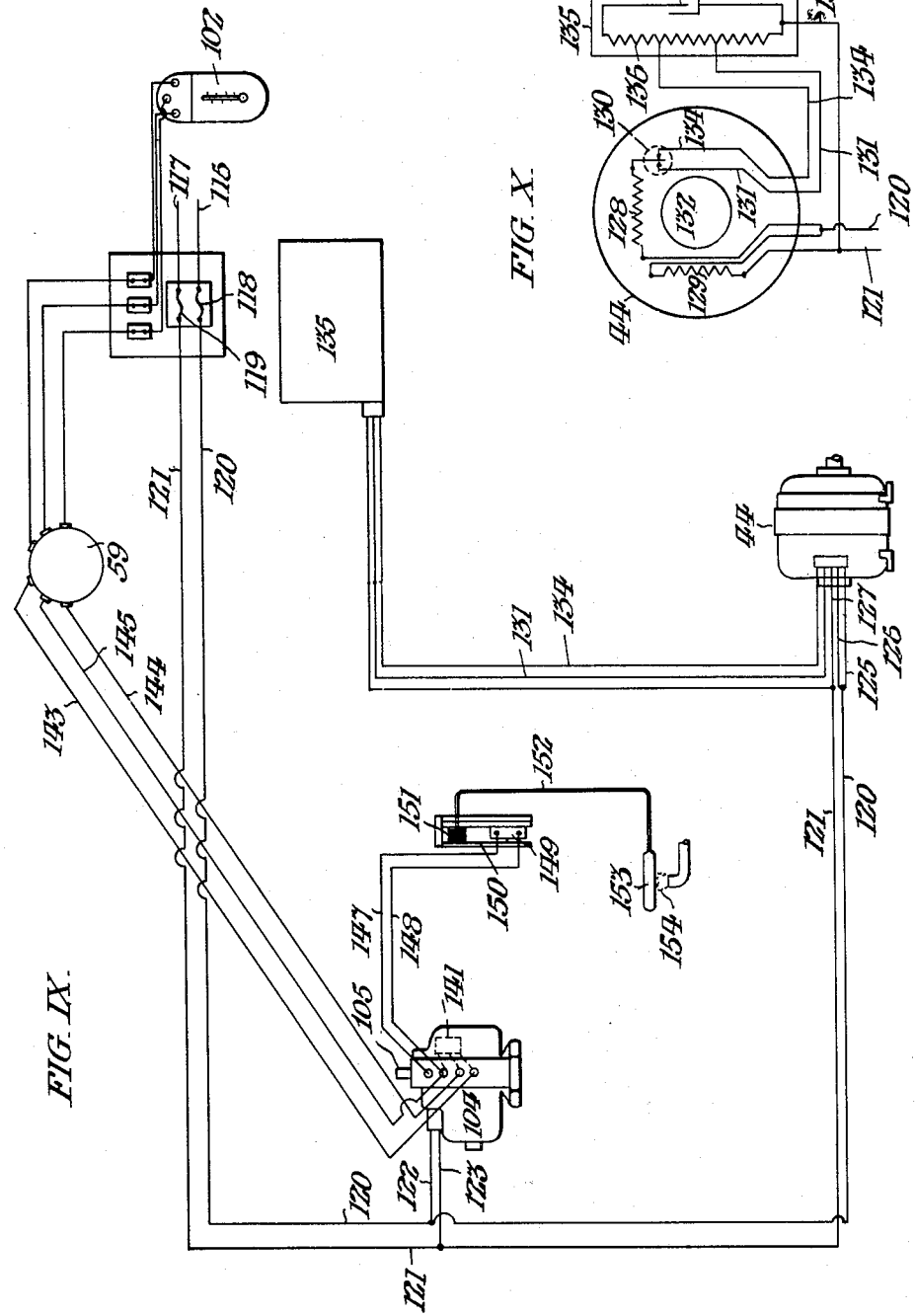
INVENTOR:
ALOYSIUS T. SPONAR.

June 16, 1931.  A. T. SPONAR  1,810,887
GAS WATER HEATER
Filed Aug. 9, 1929  5 Sheets-Sheet 5
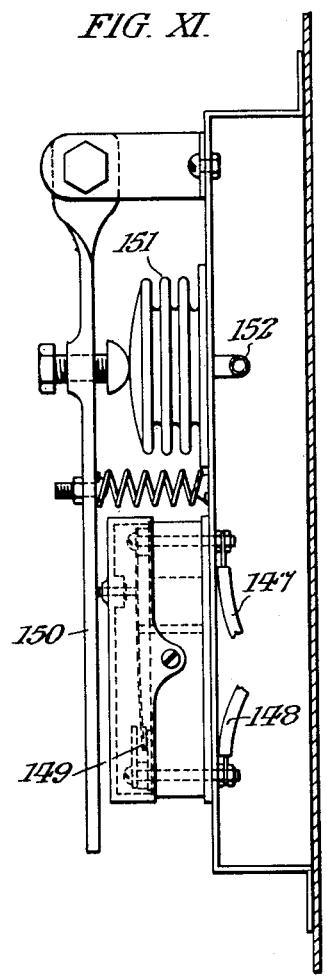
FIG. XI.
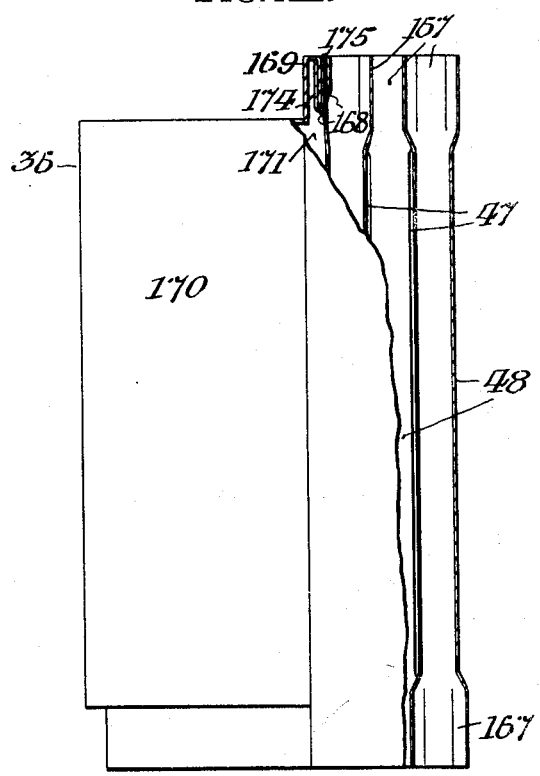
FIG. XIII.
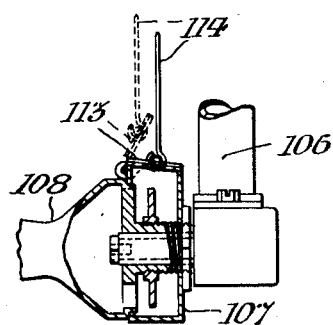
FIG. XII.
INVENTOR:
ALOYSIUS T. SPONAR, Patented June 16, 1931

1,810,887

UNITED STATES PATENT OFFICE

ALOYSIUS T. SPONAR, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA

GAS WATER HEATER

Application filed August 9, 1929. Serial No. 384,631.

The temperature control system for hot water heating systems hereinafter described is the subject matter of my application Serial No. 454,372, filed May 21, 1930, for Letters Patent of the United States for improvement in temperature control systems for hot water heating systems, which is a division hereof.

My invention relates to apparatus of the general class contemplated in Letters Patent of the United States 1,715,040 granted to Victor Mauck May 28, 1929, for domestic heating, wherein the water heated is forcibly circulated thru a piping system including radiators remote from the heater, and conveniently by an electrically actuated pump, and the operation of the heater is automatically controlled by thermostatic means operative upon a valve to supply more or less fuel gas to the burner in accordance with the temperature of the atmosphere surrounding the thermostat. That is to say, when said atmosphere reaches a predetermined temperature, the supply of gas to the burner is diminished to such a degree that only a small pilot flame is maintained, but such flame is enlarged by automatically opening the gas valve when the temperature at the thermostat falls below a predetermined degree. Such thermostatic controlling means is also operative upon the motor which actuates the water circulating pump.

Apparatus of that general character is also the subject matter of my copending applications for Letters Patent of the United States, which are respectively Serial No. 218,013, filed September 7, 1927, and Serial No. 286,373 filed June 18, 1928. In such apparatus I have found it convenient to employ heater sections of a cellular type, formed of congeries of thin copper flue tubes having their opposite ends enlarged and connected, laterally, by solder, to form water spaces around the tubes. Such heater units are extremely efficient in the transfer of heat from the flue gases to the water, but it is necessary to avoid raising the temperature of such cellular structure to such a degree that the water pressure would disrupt the soldered joints. In accordance with my present invention, the gas burning capacity of such heater of a given size and consequent ating efficiency has been very largely increased in comparison with the prior art by means automatically insuring that the water shall be actively circulating in the heater sections, each time the heating effect of the burner is augmented in response to the operation of the thermostat to produce more heat, to thus prevent overheating the soldered joints by the increased consumption of gas.

The form of my invention hereinafter described includes accessory safety devices. For instance, thermostatically operative means for entirely shutting off the gas supply conduit leading to the burner if and when the flames at the burner are entirely extinguished, as may accidentally happen, by abnormal reduction in gas pressure incident to abnormal demand upon the gas supply mains local to the heater. That device not only prevents the waste of gas which would otherwise be occasioned by the automatic operation of the thermostat to increase the flow of gas to the burner, but eliminates the possibility of ultimate explosion of gas flowing from the burner unignited. Another safety device automatically shuts the primary air port leading to the mixing chambers of the burner, in which air and gas are mixed preparatory to ignition, so as to prevent backfiring the residue of such mixture, in the burner when the gas is shut off, and the alarming explosive noise incident to such backfiring.

My invention includes the various novel features of construction and arrangement hereinafter more definitely specified.

In said drawings: Fig. I is a front elevation of a heater conveniently embodying my invention. Fig. II is an elevation of the right hand side of said heater as shown in Fig. I. Fig. III is a rear elevation of said heater as shown in Fig. I. Fig. IV is a plan view of said heater. Fig. V is a vertical sectional view of said heater taken on the line V, V, in Figs. II and IV. Fig. VI is a vertical sectional view taken on the line VI, VI, in Figs. I and IV. Fig. VII is a vertical sectional view taken on the line VII, VII, in Figs. II and IV. Fig. VIII is a vertical sectional view taken on the line VIII, VIII, in Figs. I and IV. Fig. IX is a diagram showing the electrical connections of the several parts of said heater structure. Fig. X is a diagram, on a larger scale than Fig. IX, showing the electrical connections of the pump motor and its appurtenances. Fig. XI is a longitudinal sectional view of the thermostatically operative electric switch indicated in Fig. VII; but on a larger scale. Fig. XII is a sectional view of the burner mixing chamber and its appurtenances shown in Fig. VIII, but on a larger scale. Fig. XIII is a fragmentary vertical sectional view of one of the cellular heater units shown in Figs. V and VI, but on a larger scale.

Referring to Figs. I to IV inclusive, the heater casing includes the front wall 1 having the louvered inlet panel 2 at the bottom thereof and the hinged doors 3 and 4, which are normally closed but conveniently provided with fastening means 5 to afford access to the interior mechanism hereinafter described. The back wall 6 has the inlet opening 8 for the water supply pipe, and the condensate drain outlet opening 9 near the bottom thereof. Also, said back wall 6 has the upper openings 11 and 12, respectively for the main electric conductors to supply the pump motor and for the cable leading to the thermostat, exterior to said casing, which controls the operation of the heater as above contemplated and hereinafter more particularly described.

The right side wall 14 of said heater casing has openings 15 and 16, respectively for the gas supply pipe and to afford access to a gas valve as hereinafter described, and the opening 17 near the upper portion of said wall 14 affords access to the electric fuse and other fitting panel hereinafter described, and is provided with a removable door 18 which is normally closed. The panel 19 at the bottom of said wall 14 is normally stationary but is removable to afford access to the interior of said casing and the pump, motor, and its appurtenances above mentioned and hereinafter more particularly described. The left hand wall 21 of said casing is blank, as is the bottom wall 22, but the top wall 23 has the large opening 24 affording access to the interior of said casing and provided with the door 25, which is normally closed. Said top wall 23 also has the flue outlet flange 27 and the hot water outlet opening 28.

Said outer casing above described incloses the inner heat insulating casing 30 packed with insulating material 31, such as cellular asbestos fabric, incasing the water jacket shell 32 of the combustion chamber shell 33, and the vertical flue casing 35 for the heater units 36 and 37. The inclined flue outlet casing 39 leads from said casing 35 to the cylindrical flue pipe flange 27 which projects above said top wall.

Such construction and arrangement not only separates the combustion chamber from the outer casing by a plurality of heat insulating mediums, to wit, the material 31 and the air between it and said outer casing, thus conserving the heat within said outer casing, but insures that the air admitted thru said inlet 2 is warmed before its admission to the combustion chamber within said shell 33, and thus facilitates combustion. The rectangular shape of said outer casing, with the combustion chamber connected therewith in a corner thereof remote from said inlet, as indicated in Fig. IV; not only enhances that preheating effect, but affords the necessary protected space for the other appurtenances of the heater structure hereinafter described, and facilitates the assembly and maintenance of those structures in the desired relative positions with the minimum cost for packing the entire heating structure for transportation, in minimum space.

Water is supplied to said heater from the exterior pipe 41 thru the conduit 42 in said casing, at the axis of the rotary pump 43 which is conveniently operated by the electric motor 44 to discharge the water under pressure thru the conduit 45 to the space between the water jacket 32 and the combustion chamber shell 33. The heated water passes from said jacket space thru the nipple 46 to the water passageways 47 around the flue tubes 48 in the heater unit section 36 and thence thru the nipple 50 to the similar water spaces in the heater section 37. The heated water passes from said heater section 37 thru the conduit 51, under control of the valve 52, to the hot water discharge pipe 53 leading to the radiators 55 from which a return pipe or pipes 56 may communicate with said pipe 41; so that the water may be circulated in a substantially closed system. I find it convenient to connect said conduit 51 by the branch 58 with the pressure gauge 59 and by the branch 60 with the thermometer 61 which has respective dials 62 and 63 presented at the front face of the heater, as indicated in Fig. I.

As there is considerable moisture condensed from the products of combustion of any mixture including air; I find it necessary to provide means for receiving and discharging such condensate to waste. In the construction and arrangement shown, such means include the baffle hood 65 having the inclined flange 66 extending to the side walls of said shell 33 which sheds the condensate toward said wall, and two outlet elbows 68 and 69 at diagonally opposite corners of said casing 33 as indicated in Fig. IV, from which respective tubes 70 and 71 depend so as to discharge the condensate into the pan 73 which rests upon the bottom wall 22 of said casing, in the confined heated atmosphere between said outer casing and the combustion chamber, which facilitates revaporization of said condensate. The condensate discharging means also conveniently include the funnel 74 at the bottom of the flue casing 39 from which depends the tube 75 which leads into the pipe 70 below the elbow 68. Such arrangement is desirable because the heat of combustion which revaporizes the major portion of the condensate from said hood flange 66 leaves a deposit of solid matter from the condensate at the junctions of said flange with said elbows 68 and 69 which must be removed at intervals, and the necessity for such removal is rendered less frequent by the provision of two such elbows instead of one, and the location of the discharge end of the pipe 75 below the region of deposit of said solid matter insures that the condensate shall be free to pass from said tube 75 regardless of the clogging effect of the deposits at the elbows.

Gas is supplied to said casing from the exterior pipe 77 thru the fitting 78. Said fitting 78 incloses means for filtering the gas to free it from dust and other impurities, including the foraminous cylindrical cup 79 which is detachably held in cooperative relation with the inlet port 80 in said fitting 78 by the compressed spring 81 which is held in position by the removable screw plug 82. Said fitting is conveniently provided with the rotary plug valve 84 controlling the passage of gas therethru, and accessible from the exterior of the casing thru the opening 16 shown in Fig. II. The gas passes thru said valve 84 to the positive pressure regulator 85 which is adjustable to predetermine and control the pressure at which the gas is delivered to the burner. However, the gas conduit 86 leads to the automatically operative valve 87 in the casing 88 which is opened and shut automatically, conveniently by sylphon bellows 89 and 90 which are mounted in the frame 91, and coupled by the plunger 92 mounted to reciprocate in said frame. Said sylphon bellows 89 and 90 are respectively connected by tubes 94 and 95 with the intake and outlet sides of said pump 44. Said valve 87 and said bellows 89 and 90 are so constructed and arranged that said valve is shut to prevent the passage of gas to the burner 97 unless and until the water is being positively circulated by the operation of said pump 44. In a convenient commercial embodiment of said invention, said valve 87 is normally maintained shut by a spring 99 exerting a pressure of about five pounds upon said valve, and that pressure is overcome by between five and six pounds stress upon the bellows 89, plus about three pounds stress upon the bellows 90, when said pump is in operation. The effect of that arrangement is to insure that the water shall be actively circulating thru the heater units 36 and 37 before said valve 87 opens to augment the heat from said burner 97.

Moreover, said gas conduit is provided with the electrically operative valve 100 having the spring 101 tending to close it, but which is under control of the room thermostat 102 so that said valve 100 is opened when the atmosphere surrounding said thermostat falls to a temperature lower than that for which the thermostat is set. Said thermostat opens and closes the electric circuit of the motor 104 which is designed to lift said valve by its stem 105 but stalls and stops when said valve is wide open, but, while said circuit remains closed, serves as an electric magnet to uphold said valve 100, wide open, until the circuit is broken at said thermostat, whereupon, said valve 100 is automatically shut, by said spring 101.

The conduit 106 connects said valve 100 with the burner manifold 107 which is common to the two Venturi mixing tubes 108 and 108, thru which the combustible mixture is equally distributed to the outer burner ring 109, having slot orifices 110, and to the inner burner ring 111, having slot orifices 112.

Said gas burner manifold 107 is conveniently formed as a rectangular metal box having the hinged flap valve 113 which is normally closed, by its own weight, but is arranged to be opened when said valve 100 is opened, by the wire link 114 extending from the stem 105 of said valve 100 to said valve 113.

The purpose and effect of thus coupling said valves 100 and 113, is to open the burner mixing tubes 108 and 108 to the atmosphere to admit primary air for mixture with the gas, whenever the latter is admitted by the valve 100; but to shut off the primary air supply, whenever the gas is shut off at said valve 100, and thus cause the residue of the mixture in said burner and tubes to be gradually consumed at the burner orifices, without backfiring and consequent noise.

Referring to Fig. IX, I find it convenient to supply electrical energy to the motors 44 and 104 by the conductors 116 and 117; the former being the "hot side" and the latter the "ground side", of the line. Said conductors lead thru respective fuses 118 and 119 to the conductors 120 and 121 which have respective branches 122 and 123 leading to said motor 104, and branches 125, 126, and 127 leading to said motor 44; both of said conductors 125 and 126 being connected to said conductor 120 and said conductor 127 being connected to said conductor 121; the arrangement being such that said motors 44 and 104 are connected in multiple relation.

As indicated in Fig. X; said motor 44 includes the starting field coil 128, the main field coil 129, and the centrifugal switch 130; so constructed and arranged that, in starting, the circuit thru the starting coil 128 is closed thru the conductor 131, but, when the motor rotor 132 has reached a predetermined speed, said switch 130 breaks the circuit thru the conductor 131 and closes it thru the conductor 134. Said conductors 131 and 134 lead to the starting box 135 and are connected with different regions of the transformer coil 136 which is connected at its opposite ends to the condenser 137. The conductor 139 extends from said conductor 121 to one end of said transformer coil 136 so that said transformer coil 136 and condenser 137 are connected therewith in parallel relation.

The construction and effect of the motor starting equipment above described are to properly initiate the operation of said motor 44 if and when the circuit is closed, including that motor in operation with the main supply conductors 116 and 117, and to avoid sparking at said motor, and consequent disturbance of any radio receiving apparatus in the neighborhood of said heater.

The casing of said valve motor 104 includes a transformer 141 comprising a primary coil energized by the motor supply circuits 116 and 117, which may carry one-hundred and ten, or two-hundred and twenty, volts. The secondary coil is connected by the three conductors 143, 144, and 145, with said pressure gauge 59 and said thermostat 102, so that both of said instruments operate on a low voltage, for instance, six volts. Said pressure gauge 59 is so constructed and arranged as to break the circuit which otherwise would energize the motor 104, if and when the pressure of the water reaches a predetermined degree; to stop heating, whenever a predetermined dangerous pressure of the water is approached; which condition may arise if the thermostatic control 102 calls for heat because of the cooling effect of an open door or window, which prevents said thermostat 102 from reaching the predetermined temperature to stop the heater, altho the latter is generating an abnormal amount of heat.

I also find it convenient to extend the circuit for energizing said motor 104 thru conductors 147 and 148 to the switch 149 which is normally closed by the lever 150 under expansion of the sylphon bellows 151. Said bellows is thus normally expanded by heated air in it and in the conduit 152 and the bulb 153, as long as said bulb is heated by the pilot flame 154 beneath it, at the burner pilot tube 155, which is supplied thru the pipe 77 above described. Said bulb 153 and its appurtenances act as a safety device to open said switch 149 and break the circuit thru the valve motor 104 whenever the flame 154 is extinguished at the burner; to thus shut, or keep shut, the valve 100 to prevent discharge of gas to waste at the burner when there is no pilot flame to light it.

Said pilot burner 155 is supplied with gas thru the pipe 156 leading to the casing of the valve 88 on the intake side of the latter and under control of the stop cock 157 which also controls the flow of gas thru the pipe 161 to the manifold 162 which supplies two other pilot burner tubes 163 and 164 which extend upwardly between said burner rings 109 and 111.

The heater apparatus above described is operated as follows: Said gas valve 84 is arranged to be operated by the wrench 158 which, when the gas is shut off, stands in the position shown in full lines in Fig. II. The doors 3 and 4 and the valve 157 controlling the three pilot burners being opened; said gas valve 84 is opened by turning its handle from the position shown in full lines to the position shown in dotted lines in Fig. II. That operation supplies gas from the pipe 77 thru the pipe 156 to each of the pilot burners 155, 163, and 164, and the operator then lights those burners, with a taper or any other suitable means. However, as the valve 87 remains closed by its spring 99, the fuel gas is prevented, for the time being, from escaping at the main burner 97. However, after a couple of minutes, the pilot flame 154, indicated in Fig. IX, will heat the air confined in the bulb 153 so as to expand it and create such pressure of expansion in the bellows 151 as to swing the lever 150 to the left in that figure and thus close the electric circuit at the switch 149. That circuit being already closed at the manually operative switch 142; the valve motor 104 is thereby energized to open the gas valve 100 and simultaneously relay current to the pump motor 44 which then starts. Opening movement of said valve 100 causes its stem 105 to open, by the wire link 114, the flap valve 113 which is the shutter theretofore preventing admission of primary air to the gas burner manifold 107. However, gas is not admitted to said manifold 107 of the burner 97 unless and until said pump motor 44 operates the pump 43 to produce such stress upon the plunger 92, by the sylphon bellows 89 and 90, as to open said gas valve 87. Thereupon, gas being admitted thru said valve 87 and the previously opened valve 100, and thru said manifold 107 to both of the burner rings 109 and 111, such gas is ignited at the slot orifices 110 and 112 by the pilot lights aforesaid.

Thereafter, the heater will continue to operate by flames from said main burner 97 until either the room thermostat 102 opens the circuit, because the temperature for which it is set is reached, or, if the temperature of the room containing said thermostat 102 fails to reach the degree to which it is set because of a draught from an open door or window; the pressure regulator 59 will operate to open the electric circuit when the temperature for which it is set is reached, and thus stop the operation of the main burner 97, by permitting the valve 100 to be closed by its spring 101; thus shutting off the supply of gas to the manifold 107 and simultaneously shutting off the supply of primary air to the burner 97 by closure of the shutter flap valve 113 upon said manifold. As the pump motor 44 is also stopped by the breaking of said circuit at either the thermostat 102 or the pressure gauge 59; the sylphon bellows 89 and 90 are relieved from the stresses created by the operation of said pump, and thereupon release the plunger 92 of the valve 87 so as to permit the latter to be closed by its spring 99, as the pump motor 44 ceases to revolve. Thereupon, the residual combustible mixture of gas and air in the burner 97 is slowly consumed at its orifices 110 and 112 with a rapidly diminishing flame which burns out without backfiring; leaving only the flames at the three pilot burners 155, 163, and 164 to relight the main gas burner 97 if and when the opening operation of the valves 100 and 87 is effected as the consequence of the operation of the room thermostat 102 as above described; provided that the circuit is closed at the pressure gauge 59 by reduction of the pressure of the water, in the system, incident to the cooling of the latter; for, as above described, the movement of the thermostat 102 to close the circuit thereat because of the drop of temperature in its environment below the degree for which it is set, does not suffice to start the main burner unless the circuit is also closed at the pressure regulator 59.

Therefore, it may be observed that the heater apparatus above described includes three distinct thermostatically operative controlling devices, to wit, the room thermostat 102, the switch 149, and the pressure regulator 59, each operative under certain conditions but all cooperating to effect the safe operation of the apparatus, as above described. Moreover, there is a fourth controlling device, to wit, that including the valve 87 and the cylphon bellows 89 and 90 for operating the same by water pressure, which prevents overheating the cellular units 36 and 37 if for any reason the water is not circulating to properly carry off the heat from such units. For instance, if the supply of electric energy fails and the motor 44 consequently remains inoperative when its circuit is closed, or if the propeller in the pump 43 becomes loose on its shaft or otherwise fails to properly circulate the water when the motor 44 is operating; the control of the operation of the heater, then effected by the valve 87, prevents the creation of any dangerous or destructive temperature.

The forcible circulation of the water of course not only permits the use of smaller water, feed, and return lines, but increases the capacity and efficiency of all of the radiators in the heating system and is practically noiseless in operation, and requires only a negligible amount of electric energy and without interference with radio reception.

I prefer to make said heater units 36 and 37 of the specific construction shown in Fig. XIII; wherein the flue tubes 48 have their opposite ends enlarged, as indicated at 167, and connected, laterally, by solder 168. The congeries of such tubes is fitted within the rectangular casing of heavy sheet metal 169. Each such congeries of tubes 48 has at its opposite ends arcuate casing members 170 inclosing water chambers 171 in communication with the spaces 47 between said tubes 48. To prevent rupture of the joints between said casing members 170 and the edges of said congeries, by the excessive contraction and expansion to which such cellular structures are subjected by changes in temperature; I prefer to provide at such joints corrugated members 174 immediately adjoining the soldered joints 175 so that the stress incident to changes in temperature are dissipated in movement of said corrugated members 174 without detrimental stresses upon the soldered joints. Such means for shutting off the primary air supply to a Bunsen burner when the gas supply thereto is shut off, as exemplified in Fig. XII, and operating as above described; is the subject matter of my copending application Serial No. 380,509 filed July 24, 1929 for Letters Patent of the United States.

Therefore, I do not desire to limit myself to the precise details of construction and arrangement of my invention, as herein set forth, as it is obvious that various modifications may be made therein without departing from the essential features of my invention, as defined in the appended claims.

I claim:

1. In a gas water heater; the combination with a rectangular outer casing; of a cylindrical shell in said casing inclosing a combustion chamber; a gas burner in said combustion chamber; a gas supply conduit leading to said burner; means controlling said gas conduit including a valve and an electric motor operatively connected with said valve; a flue casing within said outer casing and spaced therefrom above said combustion chamber and in communication therewith; a heater unit, of cellular structure including a congeries of flue tubes and water spaces between them fitted in said flue casing and spaced therefrom; a pump between said cylindrical casing and rectangular casing having a water inlet conduit leading through said rectangular casing to said pump; a water discharge conduit leading from said pump to the water spaces in said heater unit; a heater outlet conduit leading from said heater unit through said rectangular casing; an electric motor operatively connected with said pump; and a thermostat exterior to said rectangular casing constructed and arranged to control both of said electric motors in coordinate relation.

2. In a gas water heater; the combination with a rectangular outer casing; of a cylindrical shell in said casing inclosing a combustion chamber; a gas burner in said combustion chamber; a gas supply conduit leading to said burner; valve means controlling said gas conduit; a flue casing within said outer casing and spaced therefrom, above said combustion chamber and in communication therewith; a heater unit, of cellular structure, including a congeries of flue tubes and water spaces between them fitted in said flue casing, and spaced therefrom; a pump between said cylindrical casing and rectangular casing having a water inlet conduit leading through said rectangular casing to said pump; a water discharge conduit leading from said pump to the water spaces in said heater unit; and a heater outlet conduit leading from said heater unit through said rectangular casing; wherein the cylindrical combustion chamber extends vertically in one corner of the rectangular outer casing, spaced therefrom and surrounded by a heat insulating casing in part spaced from said outer casing; whereby said combustion chamber is separated from said outer casing by a plurality of heat insulating mediums around substantially its entire perimeter, and a drip pan is supported, by said outer casing, in registry with said combustion chamber shell, below the bottom of said burner.

3. In a gas water heater; the combination with an outer rectangular casing having an air inlet near the bottom of one vertical wall thereof; of a cylindrical combustion chamber shell mounted in said casing above the bottom thereof and above said air inlet and in a corner of the outer casing remote from said inlet; whereby the air admitted at said inlet is warmed before its admission to said combustion chamber; a condensate drip pan in the bottom of said outer casing adapted to receive condensate from the shell of said combustion chamber; a flue casing in communication with the top of said combustion chamber and extending laterally with respect thereto, so as to overhang said combustion chamber shell and having a condensate outlet in the bottom thereof, and a conduit extending from that flue casing outlet adapted to discharge condensate into said pan.

4. In a gas water heater; the combination with an outer metallic casing of rectangular configuration having a louver air inlet near the bottom of one vertical wall thereof, and a flue outlet casing in the top thereof in one corner of said outer casing; a combustion chamber in the opposite corner of said outer casing remote from said air inlet and in communication with said flue outlet; whereby the air admitted through said inlet is warmed before admission to said combustion chamber; a gas burner in said combustion chamber; a plane door in the wall having said louver inlet opening, and affording access to said burner; a door in said flue casing in the upper portion thereof within said outer casing; and a door in said outer casing in registry with the door in said flue casing whereby the interior of said flue casing is accessible from the exterior of said outer casing, but space is afforded between said outer casing and said flue casing for air as a heat insulating medium.

In testimony whereof, I have hereunto signed my name at Conshohocken, Pennsylvania, this twenty-second day of July, 1929.

ALOYSIUS T. SPONAR.